Jan. 9, 1951 G. H. ROSENBOOM 2,537,916
PIPE CUTTING AND TENONING MACHINE
Filed Feb. 10, 1945 2 Sheets-Sheet 1
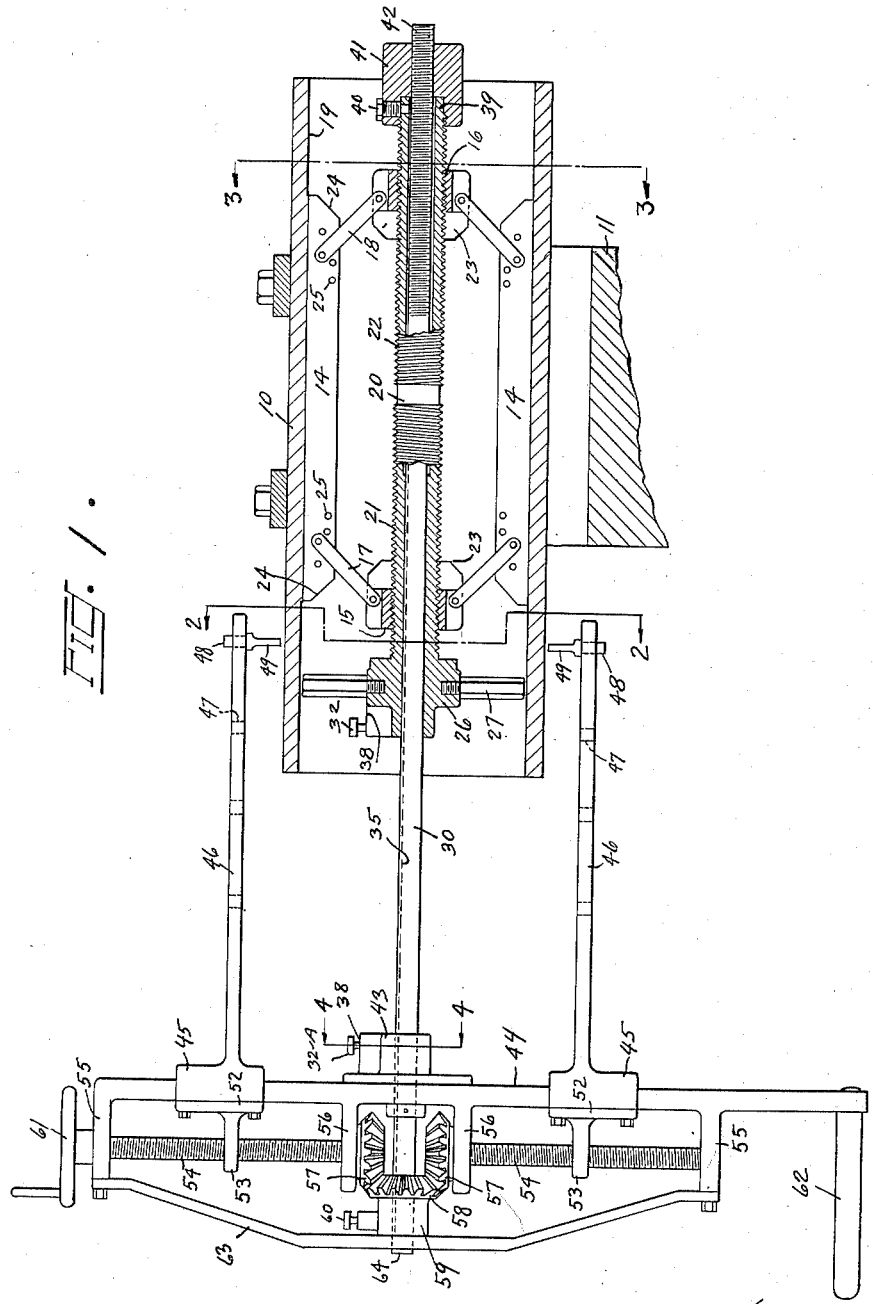
INVENTOR
G. H. ROSENBOOM.
BY
E. J. Birkenbeuel.
ATTORNEY Jan. 9, 1951 G. H. ROSENBOOM 2,537,916
PIPE CUTTING AND TENONING MACHINE
Filed Feb. 10, 1945 2 Sheets-Sheet 2
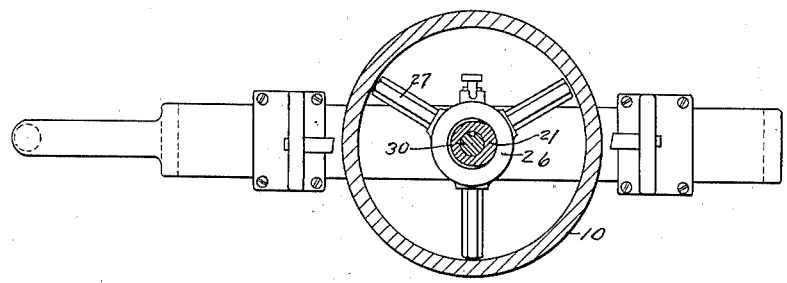
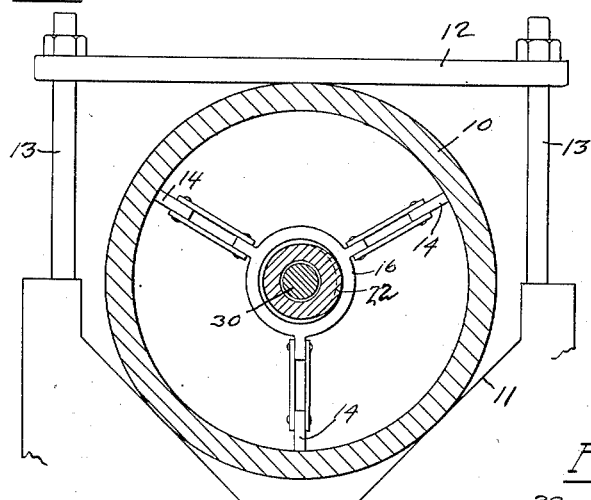
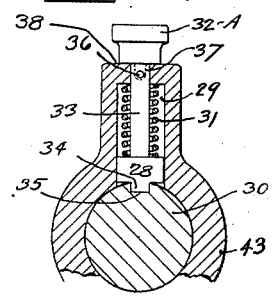
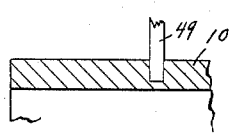
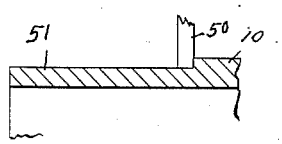
INVENTOR
G. H. ROSENBOOM.
BY
ATTORNEY Patented Jan. 9, 1951

2,537,916

UNITED STATES PATENT OFFICE 2,537,916

PIPE CUTTING AND TENONING MACHINE

Gustaf H. Rosenboom, Kalama, Wash.

Application February 10, 1945, Serial No. 577,315

2 Claims. (Cl. 144—205)

This invention relates generally to conduits for fluids and particularly to pipe cutting and tenoning machines.

The main object of this invention is to devise an improved form of machine for tenoning and cutting off conduits, particular reference being made to wooden and composition pipes.

The second object is to provide a machine of the class described having automatic feed and which is capable of accurate tenoning a pipe end with relation to its axis without resorting to the use of lathes or other expensive equipment.

The third object is to facilitate the laying of conduits by making it easily possible to obtain required lengths of pipe in the field instead of necessitating the removal of the pipes to a distant workshop.

The fourth object is to reduce the amount of breakage ordinarily occurring during transportation by eliminating the falling of the pipe sections between the point of laying and a distant workshop.

These and other objects will become more apparent in the specification following as illustrated in the accompanying drawing, in which:

Fig. 1 is a longitudinal section through the device.

Fig. 2 is a transverse section taken along the line 2—2 in Fig. 1.

Fig. 3 is a transverse section taken along the line 3—3 in Fig. 1.

Fig. 4 is a transverse section taken along the line 4—4 in Fig. 1.

Fig. 5 is a fragmentary section through a portion of a pipe during a cutting off operation.

Fig. 6 is a fragmentary section of a pipe end during a tenoning operation.

Attention is drawn to my co-pending application, Serial Number 515,459, issued September 3, 1946, as Patent Number 2,407,101, over which the device described herein is an improvement.

Similar numerals refer to similar parts throughout the several views.

Referring in detail to the drawing, there is shown a section of pipe 10 mounted in a cradle 11 and held therein by means of a clamping bar 12 and the bolts 13, the purpose of which is to prevent the pipe 10 from rotating or sliding during the operation which is to be performed thereon.

In Fig. 1 is shown three shoes 14 which are mounted on the nuts 15 and 16 by means of the toggle links 17 and 18. The shoes 14 are intended to contact the interior 19 of the pipe 10 in order to hold the nuts 15 and 16 coaxial with the pipe 10. Extending through the nuts 15 and 16 is a sleeve 20, whose left hand threaded end 21 extends through the nut 15 and whose right hand threaded end 22 extends through the nut 16. The nuts 15 and 16 are provided with tubular ends 23, which are adapted to engage the inclined corners 24 of the shoes 14 when the pipe 10 is of a very small diameter.

It is desirable to provide the shoes 14 with a plurality of holes 25 in order to increase the number of working positions with relation to the various pipe diameters. On the threaded end 21 is provided a hub 26, into which screw the stud bolts 27 which hold the pipe 10 approximately coaxial with the sleeve 20.

The hub 26 is provided with a plunger 28, which is slidable within the recess 29 and is urged inwardly toward the shaft 30 by means of the spring 31. A button 32 is provided on the stem 33, which is connected to the plunger 28. The plunger 28 is provided with a key 34 adapted to engage the key way 35 in the shaft 30. The stem 33 is provided with a pin 36 which may occupy the notches 37 in the face 38 of the hub 26, or if it is desired to hold the key 34 out of engagement with the key way 35, the pin 36 may rest upon the face 38.

The end 39 of the sleeve 20 has secured thereon by means of a set screw 40, a nut 41 through which the threaded end 42 of the shaft 30 is threaded.

On the outer end of the shaft 30 is mounted a hub 43, which is similar to the hub 26 except that its button will be referred to as 32—A in order to explain the invention.

It will be understood that the buttons 32—A and 32 simply determine which of the hubs 26 or 43 are keyed to or released from the shaft 30.

Secured to the hub 43 is a transverse guide bar 44. The bar 44 constitutes a slide for the crossheads 45, from which project the tool holding bars 46 provided with holes 47 for the shanks 48 of the bits 49. The bits 49 may be of the cut-off variety, as shown in Fig. 5, or as shown at 50 in Fig. 6, wherein it is desired to form a tenon 51. The crossheads 45 are provided with cover plates 52, from which project the arms 53 through which are threaded set screws 54. The screws 54 are supported on the outer ends by means of the standards 55 and at their inner ends by the standards 56 in which the screws 54 are capable of rotation. The inner ends of the screws 54 have secured thereon the bevel gears 57, both of which mesh with the idler gear 58, which is mounted on the shaft 30 and is provided with a hub 59. It has the same general construction shown in Fig. 4, and its control button 60 is used to determine its relationship to the shaft 30. That is, whether or not it is secured thereto or free to rotate thereon. A hand wheel 61 is mounted on the outer end of one of the screws 54. A handle 62 is secured on one end of the bar 44.

It is desirable to provide a bar 63 which extends across the standards 55 and supports the outer end 64 of the shaft 30. The operation of the device is as follows:

Assuming that a piece of pipe 10 is to be cut off, it is first placed in the cradle 11 and clamped therein by means of the bar 12. The proper stud bolts 27 being in place on the hub 26, the device is first inserted into the pipe 10 and the buttons 32, 32—A and 60 are operated to bring the parts into a driving relationship with the shaft 30, then when the handle 62 is turned, the bar 44, which is keyed to the shaft 30, turns the hub 26 and therefore the sleeve 20 and the right and left hand threads 21 and 22 move the nuts 15 and 16 toward or away from each other; if toward each other, then through the links 17 they cause the shoes 14 to expand and forcibly engage the interior surface 19 of the pipe 10, thereby holding the shaft 30 in accurate alignment with the axis of the pipe 10.

Now if it is desired to merely cut off a length of the pipe 10 as shown in Fig. 5, the button 32—A is withdrawn, releasing the hub 43 from the shaft 30, then as the handle 62 is turned the gears 57 revolve about the fixed gear 58 imparting a rotary motion to the screws 54 so that as the bits 49 revolve about the pipe 10 they may be fed toward same to perform the cut off action.

If it is desired to form a tenon on the pipe 10, as shown in Fig. 6, then the button 32—A is moved to lock the hub 43 to the shaft 35 until the proper diameter is obtained, after which the button 32—A is withdrawn while the button 32 is moved to free the hub 26 from the shaft 30, leaving the hub 43 secured to the shaft 30 while the shaft 30 is free to rotate in the hub 26. Since the nut 41 is secured on the stationary sleeve 20, it follows that the rotation of the threaded end 42 will draw the entire device along the pipe 10, thereby producing the desired tenon 51.

In some cases where the reduction in diameter to form the tenon is considerable and the tenon is of great length, the number of bits may be distributed along the length of the arms 46. Ordinarily the bits 49 and 50 are kept as near the crossheads 45 as practical.

It can be seen from the foregoing that by the simple arrangement above illustrated and the selective manipulation of the buttons 32, 32—A and 60, the device may readily perform a number of different operations such as clamping the device in place, cutting off or turning down the outer diameter of the pipe 10.

What I claim is:

1. In a device of the class described, the combination of a sleeve adapted to be mounted within a pipe along the axis thereof, a shaft disposed within said sleeve and projecting from the end thereof, means for selectively locking said shaft to said sleeve, a nut on said sleeve through which the end of said shaft is threaded whereby the rotation of said shaft will change the longitudinal relationship between said sleeve and shaft, a bar mounted transversely on said projecting shaft end having means for selectively securing same to said shaft or for permitting same to rotate thereon, said bar having crossheads mounted thereon including tool supporting arms adapted to move in a cylindrical orbit, and means for feeding said crosshead radially along said bar as it is rotated.

2. A pipe cutting machine having in combination a set of expanding shoes adapted to engage the interior of a pipe, a sleeve extending along the axis of said shoes and pipe, the opposite ends of said sleeve being reversely threaded, a nut on each threaded sleeve end, toggle links between said nuts and shoes whereby the rotation of said sleeve will expand or retract said shoes, a nut secured on one end of said sleeve, a shaft within said sleeve having a threaded end extending into said nut, a bar transversely mounted on said shaft, means for releasably locking said bar to said shaft, a gear mounted on said shaft, means for releasably connecting said gear and shaft, tool holding bars slidably mounted on said transverse bar having cutting bits mounted thereon, a pair of oppositely threaded feed screws journalling in said transverse bar and threaded through said tool holding bars, a gear on each of said screws meshing with said first mentioned gear and means for imparting motion to said feed screws.

GUSTAF H. ROSENBOOM.

REFERENCES CITED

The following references are of record in the file of this patent:

UNITED STATES PATENTS

| Number | Name | Date |
|---|---|---|
| 438,731 | Jefferis | Oct. 21, 1890 |
| 938,058 | Johnston | Oct. 26, 1909 |
| 1,029,584 | Berghausen | June 18, 1912 |
| 1,823,959 | Steinmayer | Sept. 22, 1931 |
| 1,841,550 | Parker | Jan. 19, 1932 |
| 1,993,561 | Meglitz | Mar. 5, 1935 |